United States Patent [19]
Weidman

[11] 3,775,141
[45] Nov. 27, 1973

[54] HARDENED INORGANIC REFRACTORY FIBROUS COMPOSITIONS

[75] Inventor: Verne Wesley Weidman, Wilmington, Del.

[73] Assignee: E. I. du Pont de Nemours and Company, Wilmington, Del.

[22] Filed: May 3, 1972

[21] Appl. No.: 249,969

[52] U.S. Cl.................. 106/65, 106/67, 106/68, 106/69
[51] Int. Cl............................................. C04b 35/10
[58] Field of Search ................. 106/55, 65, 67, 68, 106/69

[56] References Cited
UNITED STATES PATENTS

| | | | |
|---|---|---|---|
| 2,808,338 | 10/1957 | Bruno et al. | 106/69 |
| 3,077,413 | 2/1963 | Campbell | 106/69 |
| 3,231,401 | 1/1966 | Price et al. | 106/65 |
| 3,253,936 | 5/1966 | Weindel | 106/65 |
| 3,296,060 | 1/1967 | Seitzinger | 106/69 |
| 3,321,171 | 5/1967 | Gorka et al. | 106/69 |
| 3,445,250 | 5/1969 | Preece | 106/65 |
| 3,507,944 | 4/1970 | Moore | 106/65 |
| 3,629,116 | 12/1971 | Gartner et al. | 106/69 |

*Primary Examiner*—James E. Poer
*Attorney*—Richard H. Burgess

[57] ABSTRACT

Inorganic fibers such as mineral wool are bonded in a coherent mass with a binder such as colloidal positively charged particles having a silica core and a coating of a polyvalent metal-oxygen compound. The binder is flocculated from solution onto the fibers by agents such as attapulgite or hectorite. A flocculated and bonded wet compact of this material is impregnated with negatively charged colloidal silica to produce a hard body.

13 Claims, No Drawings

HARDENED INORGANIC REFRACTORY FIBROUS COMPOSITIONS

BACKGROUND OF THE INVENTION

This invention relates to compositions primarily of inorganic fibers held in a coherent mass by a binder. These compositions are useful as insulation panels, molds and other structural elements which must be capable of withstanding high temperatures. U.S. Pat. No. 3,100,734 teaches the use of colloidal silica as a binder for refractory fiber structures. While the patent alleges the structures so made are suitable for temperatures as high as 2,300°F several problems arise. It is difficult to deposit all of the colloidal silica from solution onto the fibers. Thus some silica remains in solution and is lost. Further, to impart additional strength to the articles the patent teaches addition of an organic binder in addition to the silica. This binder is burned off in use and the strength it imparts is lost.

U.S. Pat. No. 3,224,927 suggests the use of starch to cause silica binders to precipitate onto the refractory fibers. While this cuts down on silica use and provides adequate strength it also decreases the maximum temperature at which the structure can be used to about 1,000°F. An improvement in working temperature from 1,000° to 1700°F was achieved by substitution of inorganic fibrous potassium titanate for the starch as a flocculent. This flocculent was compatible with binders such as positively charged colloids having a dense silica core coated with a polyvalent metal-oxygen compound. The use of potassium titanate as a flocculant is taught in Defensive Publication 724,222. However, even this improved system could not completely exhaust all of the binder onto the fibers and the resulting structure could not be used at gas flame temperatures, 2,000°–2,300°F.

This invention represents an improvement over applicant's copending application Ser. No. 195,864 filed Dec. 1, 1971 which is concerned with similar but softer materials not impregnated with negatively charged colloidal silica.

SUMMARY OF THE INVENTION

Flocculated, totally inorganic fibrous refractory compositions consisting essentially of 50 to 98 parts by weight fibers and 2 to 50 parts by weight binder plus flocculent where the weight ratio of binder to flocculent is from 3:1 to 1:5 and 10% to 200% by weight negatively charged colloidal silica impregnant based on the weight of the fibers are useful for high temperature applications. Preferably, 30% to 150% impregnant is used to minimize migration of the colloids. Binders for these structures are positively charged colloidal particles that can be silica coated with a polyvalent metal-oxygen compound, boehmite alumina, amorphous fumed alumina or basic aluminum chloride. Suitable flocculents are negatively charged clay-minerals such as montmorillonite, saponite, hectorite and attapulgite. The term "consisting essentially of" is intended to indicate the essential components of the compositions of this invention but is not intended to exclude other components which can be added without detracting from the use of the compositions of this invention as refractory articles.

These structures can be made by first forming a dilute (1–5% solids) aqueous slurry of inorganic fibers, and adding the positively charged binder. Usually the binder is added as an aqueous suspension. After the binder is mixed with the fiber slurry the flocculent is added. The slurry with all ingredients added is mixed for an additional 5 to 30 minutes and the refractory objects are formed such as by vacuum on a screen. The wet-formed objects are then impregnated with negatively charged colloidal silica. The moist cake formed can be dried as is or it can be shaped further by molding on forms, wrapping on mandrels or the like, and then dried. The negatively charged impregnant greatly increases the strength and hardness of the objects and prevents or minimizes migration of the colloidal materials.

DESCRIPTION OF THE PREFERRED EMBODIMENTS

The refractory compositions of this invention have as their major constituent inorganic fibers. The particular inorganic fiber selected is not critical so long as it is capable of withstanding temperatures at which the finished composition is to be used. Fibers such as alumino silicates, mineral wool, fiber glass, asbestos and quartz can be used. In the process for making the compositions of this invention the refractory fibers are charged as dilute aqueous slurries. To assure uniformity in the compositions the fibers should be as completely disaggregated as possible. Thus vigorous agitation of the fiber slurry is desirable.

The binders useful in this invention are all positively charged inorganic colloids. Colloidal silica coated with a polyvalent metal-oxygen compound, amorphous fumed alumina, boehmite alumina and basic aluminum chloride are useful in this invention. The coated colloidal silica is available in the form of an aquasol of pH 2.5 to 7. Outside of this pH range the sols tend to be unstable. Negatively charged colloidal silica is coated with a sufficient amount of a polyvalent metal-oxygen compound to impart a positive charge to the coated particle. The metals are present as oxides, hydroxides or hydrated oxides. The metals useful for preparing these sols have a valence of 3 or 4. Examples are aluminum which is the preferred metal, chromium, titanium and zirconium. These sols are described in Alexander and Bolt, U.S. Pat. 3,007,878. The particle size is 2 to 100 millimicrons and the sols are available in 5 to 50% solids concentrations. These sols may be added to the slurry of refractory fibers either in their concentrated commercial form or diluted. This is the preferred binder.

Positive Sol 232 and Positive Sol 130M, both products of E. I. du Pont de Nemours and Company can be used as the binder. Positive Sol 232 is a silica sol stabilized by reacting with boric acid stabilized aluminum acetate as described in U.S. Pat. No. 3,620,978 - Moore. Positive Sol 130M is an acidic aqueous dispersion of positively charged colloidal particles consisting of a dense silica core coated with positively charged polymeric Al-(-Al) species, with a mole ratio of aluminum to silica on the surface of about 1:1.

Alumina in several forms is a suitable binder. One is boehmite alumina monohydrate. This product and its preparation are described in U.S. Pat. No. 2,915,475. Boehmite alumina is also a commercially available product having the name DISPAL. The alumina fibers described in the patent are on the order of from 100 to 1,000 millimicrons in length and on the order of 10 millimicrons in diameter. Another useful form of alumina is colloidal fumed alumina. These materials when used as binders may be charged to the fiber slurry as the commercial solid particulate matter or as an aqueous dispersion.

Basic aluminum chloride, $Al_2OH_5Cl$, is also a useful binder in this invention. While it would seem that this is not a positively charged colloid, when the described compound is dispersed in water it is present as colloidal polymeric cations with the chloride ions in solution. This material is commercially available either as a solid or liquid.

Because of the efficiency of the flocculating agents of this invention, 90 to 95 percent of the suspended binder is exhausted onto the refractory fibers. Thus the amount of binder charged to the slurry should be 5 to 10 percent greater than the amount desired in the final composition. Flocculents of the prior art are unable to achieve this high rate of binder exhaustion, and thus their use requires that greater amounts of binder be used. This often causes increased viscosity and difficult filtration of the slurry. For example, fibrous potassium titanate as a flocculent only exhausts about 85% of the binder in the slurry.

The flocculents useful in this invention are specific clay-type minerals which are negatively charged colloids. The particular materials which are effective are montmorillonites, saponites, attapulgites and hectorites. By montmorillonite is meant a mineral of the approximate formula $(Al, Fe_{0.67}Mg_{0.53})Si_4O_{10}(OH)_2$ $Na, Ca_{0.33}$. More particularly, this mineral is a bentonite clay having a high degree of exchangeable sodium associated with it. Typical of this material is the type found in the Black Hills area of the United States. The general formula shown above approximately describes the Black Hills montmorillonite. Montmorillonite found elsewhere may vary somewhat from the formula shown, and the term as used herein is not limited to minerals of the specific formula shown or to minerals from a specific geographical area. However, the general formula and geographic source provide a convenient method of designating the type of mineral encompassed within the term montmorillonite. Montmorillonite is a preferred flocculent because it is inexpensive.

Another useful flocculent is attapulgite, the principal mineral in attapulgus clay. Attapulgus clay is found in Georgia and Florida and in the Ural mountains in the U.S.S.R. This mineral, like montmorillonite, is primarily a hydrated magnesium aluminum silicate. However, the crystalline structure differs and, unlike the montmorillonite, attapulgite has a low level of associated exchangeable metal ions and does not swell in water. The formula for the ideal attapulgite is $$(OH_2)_4(OH)_2Mg_5Al_5Si_8O_2 \cdot 4H_2O.$$

Of course individual samples of attapulgite may vary from this general formula depending on their source and treatment. Attapulgite is described in detail in Industrial and Engineering Chemistry 59 pp 59–69, Sept., 1967.

Another mineral useful as a flocculent in this invention is hectorite. This mineral is sodium magnesium fluorolithosilicate. The lattice structure is of the montmorillonite type but hectorite differs from the common montmorillonites in that it contains almost no aluminum. It is substituted with lithium and has fluorine substituted for some hydroxyl groups in the lattice. This material has a high level of exchangeable sodium. It is found in the Mojave desert of California.

A fourth mineral useful as a flocculent in this invention is saponite. This mineral, like hectorite, has a montmorillonite type of lattice. In saponite magnesium is substituted for aluminum causing distortion of the lattice. Saponites from various locations and differing somewhat in composition are described in *Silicate Science*, Vol. 1, W. Eitel, Academic Press, 1964, pp 234ff. Saponite is the most effective flocculent.

Suitable negatively charged colloidal silica sols generally have particle sizes in the range of 4 to 100 millimicrons and are often stabilized with lithium, sodium or potassium. Materials commercially available from Du Pont include "Ludox" HS40 having 40% solids by weight and Ludox TM. These products are of the types described in U.S. Pat. No. 2,574,902. Lithium stabilized Polysilicate 85, with a mole ratio of $SiO_2:Li_2O$ of 8.5 is of the type described in U.S. Pat. No. 2,668,149.

In addition to the basic ingredients of the composition of this invention, inorganic fillers may be included. Materials such as zircon, alumina bubbles, zirconia, mullite, vermiculite and perlite may be included by adding them to the dilute fiber slurry. Further, other types of refractory materials such as silica may be coated onto the surface of the refractory structures of this invention. Care should be exercised so that fillers which would detrimentally interact with the binder in the fiber slurry are not used. For example, a negatively charged silica sol would cause gelation of the positively charged binders of this invention before the binder could be exhausted onto the fibers by the flocculent.

The totally inorganic structures of the compositions of this invention may be used at temperatures as high as 2,300°F without smoking or significant strength loss or shrinkage. The compositions of the prior art using organic binders or flocculents could not be used at these elevated temperatures.

The following examples further illustrate this invention. All parts and percentages are expressed on a weight basis unless otherwise noted. The modulus of rupture data was obtained by breaking test bars (dimensions 1 inch x 1 inch x 6 inches as cut from the vacuum formed pads) on an Instron Machine. Using a 4 inch span (distance between the two supports under the test bar) and a crosshead speed of 0.1 inch/min, the test bar was center loaded to failure in flexure. Modulus of rupture values were calculated using the following formula:

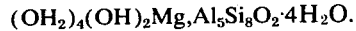

$$R = 3 \, Wl/2 \, bd^2$$

where:
R = modulus of rupture in lbs/inch²
W = load in pounds at which the specimen failed
l = distance (span) in inches between the centerlines of the lower bearing edges
b = width of specimen in inches
d = depth of specimen in inches Example 1 details the process and the test results. Three other compositions of the invention were prepared and tested as in Example 1, with the differences set forth in each example.

EXAMPLE 1

A dilute slurry is prepared containing 2-lbs. of Carborundum's "Fiberfrax" aluminosilicate refractory bulk fiber in 13-gallons (108-lbs) water. To this slurry, 0.53-lb of Du Pont Positive Sol 130M (30% solids) an acidic aqueous dispersion of positively charged colloidal particles consisting of a dense silica core coated with positively charged polymeric alumina, is added with good stirring, which is continued for 5-minutes. Next, 0.16-lb of mineral flocculent, which is a sodium exchangeable bentonitic clay ("Accofloc" 350 from American Colloid Company) is added to the slurry with good stirring in the form of a 6% solids, negatively charged colloidal suspension in water. After 15 additional minutes of stirring, a test pad, with dimensions of 9 ½ inch diameter × approximately 1 ½ inch thick, is prepared in the slurry by vacuum-forming techniques. The mold containing the wet pad is then withdrawn from the slurry with vacuum still applied. After inverting the mold assembly to a rightside-up position, excess water is removed from the pad by the vacuum in about 1-minute.

The damp pad, while still retained in the mold, is then saturated with a 50/50 mixture of Du Pont Ludox HS 40 and Ludox TM by pouring 1 liter of this colloidal silica blend over the entire exposed surface of the pad. Excess Ludox is removed from the pad by the suction, which is still maintained on the mold. The silica-impregnated pad is then removed from the mold and transferred to a perforated stainless steel plate support. After the pad is oven dried overnight in an air atmosphere at a temperature of about 400°F. test bars are cut from the pad and weighed. Strength, density, and shrinkage properties of this composite product are then determined, with the results as given below:

Density = 29-lbs/ft$^3$
Fired (linear) shrinkage 2-hrs at 2100°F = 3%
Modulus of rupture - dry = 190 psi
Fired 4-hrs at 1830°F = 137 psi
Fired 2-hrs at 2100°F = 80 psi

EXAMPLE 2

A dilute slurry is prepared containing 2-lbs of Babcock & Wilcox's "Kaowool" aluminosilicate refractory bulk fiber in 13-gallons (108-lbs) water. Into this slurry is stirred 0.26-lb of Du Pont Positive Sol 130 M. Next, 0.12-lb of "Accofloc" 350 mineral flocculent is stirred into the slurry. After 15 additional minutes of stirring, a test pad is prepared.

The damp pad is then impregnated with 1 liter of a 50/50 mixture of Du Pont Ludox HS-40 and Ludox TM, the excess Ludox is removed from the pad by the suction, and the pad is oven dried. Strength, density, and shrinkage properties of test bars of this composite product are then determined with the results as given below:

Density = 29-lbs/ft$^3$
Fired (linear) shrinkage 2 hrs at 2100°F = 3%
Modulus of rupture - dry = 257 psi
Fired 4-hrs at 1830°F = 168 psi
Fired 2-hrs at 2100°F = 110 psi

EXAMPLE 3

A dilute slurry is prepared containing 2-lbs of Fiberfrax fiber in 13-gallons (108-lbs) water. Into this slurry is stirred 0.53-lb of Du Pont Positive Sol 232 (30% solids). Next, 0.16-lb of Accofloc 350 mineral flocculent is stirred into the slurry. After 15 additional minutes of stirring, a test pad is prepared.

The damp pad is then impregnated with 1 liter of Du Pont HS-40, the excess Ludox is removed from the pad by the suction, and the pad is oven dried. Strength, density, and shrinkage properties of test bars of this composite product are then determined with the results as given below:

Density = 24-lbs/ft$^3$
Fired (linear) shrinkage 2-hrs at 2100°F = 3.8%
Modulus of Rupture - dry = 136 psi
Fired 4-hrs at 1830°F = 120 psi
Fired 2-hrs at 2100°F = 83 psi

EXAMPLE 4

A dilute slurry is prepared containing 2-lbs of Fiberfrax fiber in 13-gallons (108-lbs) water. Into this slurry is stirred 0.26-lb of Du Pont Positive Sol 130M. Next, 0.12-lb of Accofloc 350 mineral flocculent is stirred into the slurry. After 15 additional minutes of stirring, a test pad is prepared.

The damp pad is then impregnated with 1 liter of Du Pont Polysilicate 85. Excess polysilicate is removed from the pad by the suction, and the pad is oven dried. Strength, density, and shrinkage properties of test bars of this composite product are then determined with the results as given below:

Density = 22-lbs/ft$^3$
Fired (linear) shrinkage 2-hrs at 2100°F = 1.7%
Modulus of rupture - dry = 69 psi
Fired 4-hrs at 1830°F = 93 psi
Fired 2-hrs at 2100°F = 123 psi

What is claimed is:

1. A flocculated inorganic fibrous refractory composition consisting essentially of about 50 to 98 parts by weight inorganic refractory fibers and from about 2 to 50 parts by weight positively charged binder plus negatively charged flocculent, the weight ratio of binder to flocculent being from 3:1 to 1:5, and about 10% to 200% by weight negatively charged colloidal silica impregnant based on the weight of the fibers, said binder being selected from the group consisting of positively charged colloidal particles having a dense silica core and a coating of polyvalent metal-oxygen compound, colloidal amorphous fumed alumina, colloidal boehmite alumina and basic aluminum chloride, said flocculent being selected from the group consisting of montmorillonite, saponite, hectorite and attapulgite.

2. The composition of claim 1 wherein the binder is a sol of particles having a silica core coated with a polyvalent metal-oxygen compound.

3. The composition of claim 2 wherein the ratio of binder to flocculent is from 2:3 to 4:3.

4. The composition of claim 2 having from 75 to 90 parts by weight inorganic refractory fibers and 10 to 25 parts by weight binder plus flocculent.

5. The composition of claim 4 wherein the flocculent is montmorillonite.

6. The composition of claim 1 wherein from 30% to 150% by weight impregnant is used based on the weight of the fibers.

7. The composition of claim 2 wherein the flocculent is a mixture of montmorillonite and saponite.

8. A formed object of the composition of claim 1.

9. In a process for binding inorganic refractory fibers with a flocculated binder wherein said binder is selected from the group consisting of positively charged colloidal particles having a silica core coated with a polyvalent metal-oxygen compound, boehmite alumina, fumed alumina and basic aluminum chloride and the flocculent is selected from the group consisting of montmorillonite, attapulgite, saponite and hectorite, and wherein the fibers, flocculent and binders are slurried together and then filtered, the improvement comprising impregnating the wet filter cake with a negatively charged colloidal silica impregnant.

10. A process comprising the following steps:
   a. preparing a slurry of inorganic refractory fibers, a positively charged colloidal binder, and a negatively charged flocculent,
   b. filtering said slurry to form a wet compact on a filter,
   c. impregnating said wet compact with a negatively charged colloidal impregnant, and
   d. drying the impregnated compact.

11. The process of claim 10 wherein the binder is selected from the group consisting of positively charged colloidal particles having a dense silica core and a coating of polyvalent metal-oxygen compound, colloidal amorphous fumed alumina, colloidal boehmite alumina and basic aluminum chloride, the flocculent is selected from the group consisting of montmorillonite, saponite, hectorite and attapulgite, and the impregnant is colloidal silica.

12. The process of claim 10 wherein the proportion of materials used are 50 to 98 parts by weight fiber and 2 to 50 parts by weight binder plus flocculent wherein the weight ratio of binder to flocculent is from 3:1 to 1:5, and wherein the impregnant is added in an amount of from 10% to 200% by weight of the fibers.

13. The process of claim 12 in which from 30% to 150% by weight of impregnant is used based on the weight of the fibers.

* * * * *